March 31, 1953 — J. W. ANDERSON — 2,632,907
CONNECTOR FOR WIPER BLADES AND ARMS
Filed Sept. 21, 1948

INVENTOR.
JOHN W. ANDERSON
BY
Charles S. Penfold
ATTORNEY

Patented Mar. 31, 1953

2,632,907

UNITED STATES PATENT OFFICE 2,632,907

CONNECTOR FOR WIPER BLADES AND ARMS

John W. Anderson, Gary, Ind., assignor to Productive Inventions, Inc., a corporation of Indiana Application September 21, 1948, Serial No. 50,419

5 Claims. (Cl. 15—250)

This invention relates to windshield wipers and particularly to means for assembling the actuating arm and the wiper blade in operative relationship.

Windshield wiper actuating arms have a longer life than the wiper blades with the result that wiper blades of current manufacture must be adapted to operate with various types of actuating arms which have been used to equip automotive vehicles.

More specifically, an object of the invention is to provide a novel adapter or connecting means between an actuating arm having an irregularity such as a shallow curved hook on the free end and a wiper blade not originally constructed to cooperate with such an arm.

A particular object of the invention is to provide an improved one piece connector adapted to be normally carried by the arm for detachable connection with a fitting normally associated with a wiper blade.

An important object of the invention is to provide an adapter which can be easily and quickly manually attached or snapped onto the hook end of the wiper arm, and when desired may be removed therefrom.

An additional object is to provide the adapter with a part or portions which are adapted to cooperate with the fitting and latch means associated therewith in such a manner that it is impossible to disconnect the adapter from the fitting without first actuating the latch to release such part.

Another object of the invention is to provide a unique connector for a wiper blade in which the operation of the connector is influenced by the inherent resilience of the wiper element.

A further object of the invention is to provide an adapter of the character indicated which is inexpensive to manufacture, of durable construction and efficient in service.

Other objects and advantages of the invention will appear after the description hereinafter set forth is considered in conjunction with the drawing annexed hereto.

One embodiment of the invention is shown for illustrative purposes in the accompanying drawing, in which.

Figure 1:
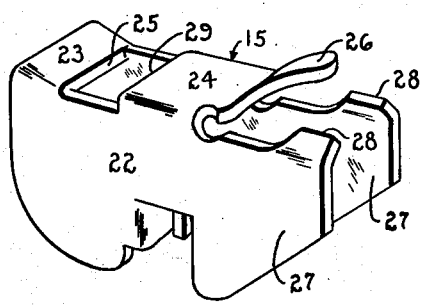
Figure 1 is an enlarged perspective view of the adapter.
Figure 2:
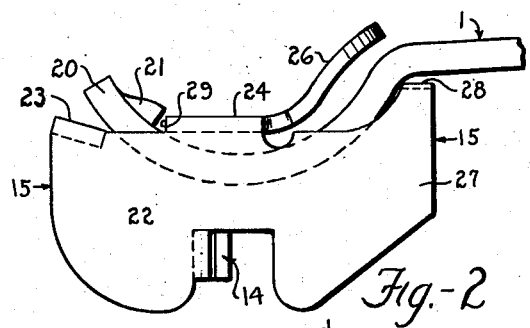
Figure 2 is an enlarged side view of the adapter connected with a wiper arm.
Figure 5:
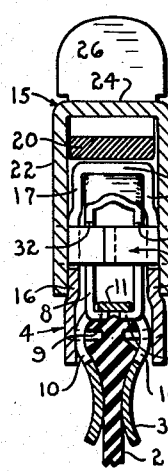
Figure 5 is a vertical section taken substantially on line 5—5 of Figure 3.
Figure 3:
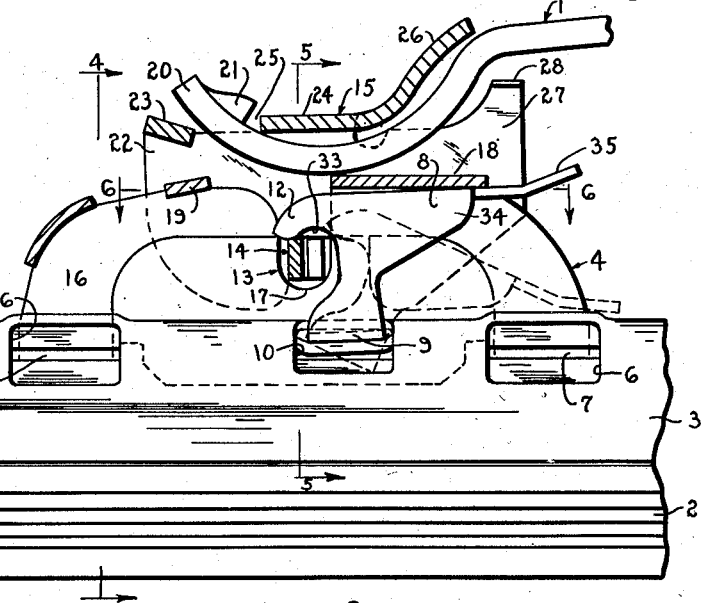
Figure 3 is an enlarged side view showing the adapter assembled with the arm and a fitting on a wiper blade, portions of which are in section to clearly illustrate the normal operating relationship of the parts.
Figure 4:
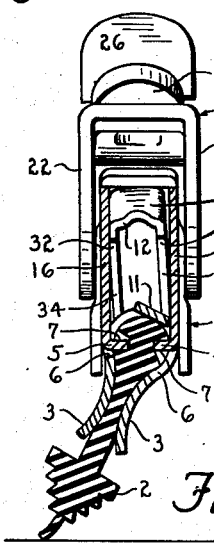
Figure 4 is a vertical section taken substantially on line 4—4 of Figure 3.

Referring particularly to Figures 3 through 5 of the drawing, the present invention is shown operatively connecting a windshield wiper blade to a wiper actuating arm 1. The wiper blade comprises a resilient wiping element 2, a channel support 3 therefor, and a channel-like connector or fitting 4 attached to and rockably or pivotally supported on the resilient wiping element 2 by means of two sets or pairs of inturned integral lugs or projections 5 extending through clearance apertures 6 in each side of the channel support 3 and engaging slots or grooves 7 preferably formed throughout the length of resilient wiping element 2.

A manually operable latch 8 operatively associated with the fitting 4 is resiliently and pivotally supported on the wiping element 2 by means of integral inturned lugs or projections 9 which extend through clearance apertures 10 in each side of the channel support 3. More specifically in this respect, the lugs 9 are inserted for disposition between the top of the wiping element 2 and the under side of the metal bridge or base portion 11 of the support 3 separating the apertures 10. With this arrangement the fitting and latch are normally maintained in an erect position by the inherent resilience of the wiping element as exemplified in Figure 5, and since the fitting and latch are each independently mounted on or carried by the element, one serves to influence the pivotal or rocking movement of the other when the blade is driven back and forth across the surface to be cleaned.

The latch 8 is arranged substantially within the confines of the fitting and is provided with a holding portion 12 which normally serves as an upper closure for an opening or recess 13 provided in the fitting 4. This recess is adapted to receive an entering part generally designated 14 carried by an adapter 15, and is preferably formed by providing the side walls 16 of the fitting with notches 17 and cutting out a portion of its top wall 18 so that the entering part 14 may be projected sideways down into the notches 17 and held therein by the latch 8. The parts are so constructed and arranged that when being connected, the entering part will engage the holding portion 12 of the latch and move the latch rearwardly as illustrated by the dotted lines in Figure 3, and when the part is properly seated in the recess 13, it will automatically return to the full line locking position. In other words, it is not necessary to manipulate or finger the latch prior to inserting the entering part into the recess.

The fitting 4 and latch 8 and manner of attaching them to the wiper blade is claimed in the application of Fred A. Krohm, Serial No. 311,425, filed September 25, 1952.

This recess is also designed to receive a crosspin carried by an arm of different current manufacture, such as an arm disclosed in the John W. Anderson Patent No. 2,432,693 dated December 16, 1947. The base wall 18 of the fitting 4 is also provided with an aperture spaced from the recess to form a bridge 19 so that another arm of current manufacture and disclosed in the aforesaid patent may be received in the hook on such arm.

The wiper arm 1 is preferably provided with a bent or shallow curved hook or finger portion 20 having an integral retaining lug or projection 21, formed adjacent the end of the finger.

The actuating arms above referred to are illustrative of those in current use which can be connected to operate with the particular blade described with the additional connector or adapter means 15 provided by the present invention.

The adapter 15 for operatively connecting the finger portion 20 of the actuating arm to the wiper blade fitting 4 is preferably constructed in one piece, generally channel in shape, and among other things, includes a pair of spaced side walls 22 joined or bridged by top or front wall portions 23 and 24 separated by a generally rectangular aperture 25 for the reception of the finger 20. The portion 24 is preferably provided with an integral rearwardly extending curved inclined pressure plate 26. The side walls 22 include yieldable or bendable portions 27 having upstanding slightly inturned locking abutments or ears 28.

Figures 6, 7:
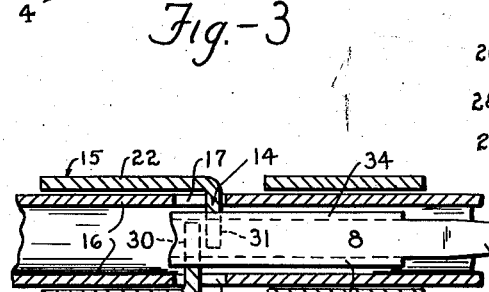
Figure 6 is a sectional view taken substantially on line 6—6 of Figure 3.
Figure 7 is a rear end view of the adapter as applied to an arm, the latter being in section.

As illustrated, particularly in Figure 7, the width of the curved finger portion 20 is slightly less than the space between the side walls 22 of the adapter but somewhat wider than the normal dimension between the abutment 28.

The adapter is preferably designed and constructed for assembly to the arm prior to connection with the fitting 4, and this is easily and quickly accomplished by simply threading the curved finger 20 in the opening between the entering part generally designated 14 and the top wall portion 24 and up through the aperture 25 to place the lug 21 on the other side of the aperture and adjacent to the end margin 29 on portion 24, whereupon pressure applied to the plate 26 will cause the finger to engage and cam the yieldable or bendable portions 27 and abutments 28 outwardly, and the moment the finger passes beyond the abutments the portions 27 and abutments will move or snap back to their normal or original position, thereby substantially locking the adapter to the arm. To release the adapter it is merely necessary to spread the abutments outwardly. It is to be understood that the connection between the arm and adapter can be effected without the provision of the pressure plate 26. Such plate however serves as a convenience, and also serves to enhance the general appearance of the assembly by more or less concealing a portion of the finger 20.

It will be noted that the top wall portion 23 of the adapter is preferably inclined and disposed in a position slightly below the plane formed by portion 24, the purpose of which is to provide clearance to facilitate entry of the finger tip into the aperture 25, and at the same time reduce the overall length of the adapter.

The connection between the adapter and arm is preferably such that the adapter may pivot to some extent so that it may more or less readily adjust itself relative to the arm and fitting 4, but is substantially held against lateral or side play when the wiper blade is directed back and forth across the windshield.

The entering part generally designated 14 provided on the adapter may be designed and constructed as desired, but is preferably comprised of a pair of integral projections 30 and 31 extending transversely inward from the side walls 22. These projections interrupt the lower marginal edges of the side walls 22, are rectangular in cross-section, and arranged in spaced apart parallel overlapping relationship, the projection 30 being slightly longer than projection 31. The size of these projections and their arrangement are preferably such that the projections will nest in the opening or recess 13 formed by the notches 17 in the side walls 16 of the fitting 4 in a manner whereby any tilting or pivotal movement occurring between the adapter and fitting will not in any way interfere with the holding action of the latch 8. In other words, the adapter cannot be unlocked from the fitting until the latch 8 is actuated. More specifically in this respect, the upper marginal edges of the inturned projections 30 and 31 are so fashioned that one or the other or both may engage the parallel marginal edges 32 and 33 formed on the corresponding side walls 34 of the latch as depicted in Figure 3, or when the position of the blade is reversed with the handle 35 of the latch extending forwardly. Although not essential, it will be noted that in either position of the blade, the holding portion 12 of the latch is disposed in the opening or space between the top wall portion 24 of the adapter and the entering part 14.

In view of the foregoing, it will be manifest that an adapter embodying improved principles of design and construction is provided for attachment with a particular form of wiper arm. It will also be evident that the blade is provided with a novel connector means, the operation of which is influenced by the inherent resilience of a portion of the wiper element, and that such adapter and connector means are constructed for detachable association in a unique manner.

Having thus described by invention, it is obvious that various modifications may be made in the same without departing from the spirit of the invention; and, therefore, I do not wish to be understood as limiting myself to the exact forms, constructions, arrangements, and combinations of parts herein shown and described and defined in the claims.

I claim:

1. An article of manufacture for connecting a bent end of a windshield wiper arm to a connector on a wiper blade, said article being of channel shape to provide a top wall and a pair of spaced substantially parallel side walls, said top wall having a bridge portion and also having an opening for receiving the bent end of an arm, means carried by and extending between the side walls and spaced from the top wall for engaging a connector, and yieldable ears extending from the side walls and spaced from the bridge portion assisting to lock the bent end of the arm between the bridge portion and ears and in the opening of the article.

2. An article of manufacture for connecting a bent end of a windshield wiper arm to a connector on a wiper blade, said article being of channel shape to provide a top wall and a pair of spaced substantially parallel side walls, said top wall having a bridge portion and also having an opening for receiving the bent end of the arm having a lug thereon, means carried by and extending between the side walls and spaced from the top wall for engaging a connector, and yieldable ears extending from the side walls and spaced from the bridge portion for holding the bent end of the arm between the bridge portion and ears and in the opening of the article in a manner whereby the bridge portion will provide a stop for the lug to prevent accidental release of the article from the said bent end.

3. An article of manufacture for connecting a bent end of a windshield wiper arm to a connector on a wiper blade, said article being constructed from a single piece of metal in the form of a channel to provide a top wall and a pair of spaced substantially parallel side walls, said top wall having a bridge portion and also having an opening for receiving the bent end of an arm having a lug thereon, an inturned projection formed on each side wall, said projections being closely related and spaced from the top wall for engaging a connector, yieldable ears extending from the side walls and spaced from the bridge portion for locking the bent end of the arm between the bridge portion and ears and in the opening of the article in a manner whereby the bridge portion will provide a stop for the lug to prevent accidental release of the article from the bent end, and said bridge portion being provided with an inclined portion which may be manually engaged to press the article onto the said bent end of the arm.

4. A windshield wiper blade, a connector carried by the blade, said connector comprising a latch and a housing provided with a recess, a channel having substantially parallel side walls straddling the connector and also having a top wall provided with a bridge portion, means carried by and extending between the side walls of the channel and spaced from the top wall, said means being seated in the recess with the latch detachably holding the means therein, said top wall being spaced from the connector and provided with an opening, yieldable ears extending from the side walls of the channel and spaced from the bridge portion, a wiper arm part arranged in the opening and between the side walls in the space between the top wall and connector, said arm part also being arranged between the bridge portion and ears, and a lug on the arm part, said lug and ears cooperating to lock the channel on the arm part.

5. An article of manufacture for connecting a bent end of a windshield wiper arm to a connector on a wiper blade, said article being of channel shape to provide a top wall and a pair of spaced substantially parallel side walls, said top wall having a bridge portion and also having an opening for receiving the bent end of an arm, means carried by and extending between the side walls and spaced from the top wall for engaging a connector, and abutment means spaced from the bridge portion and disposed between the side walls assisting to locate the bent end of the arm between the bridge portion and abutment means and in the opening of the article.

JOHN W. ANDERSON.

REFERENCES CITED

The following references are of record in the file of this patent:

UNITED STATES PATENTS

| Number | Name | Date |
| --- | --- | --- |
| 1,684,477 | Demand | Sept. 18, 1928 |
| 1,778,256 | Hueber | Oct. 14, 1930 |
| 1,944,051 | Zaiger | Jan. 16, 1934 |
| 1,971,893 | Anderson | Aug. 28, 1934 |
| 1,973,366 | Anderson | Sept. 11, 1934 |
| 2,128,454 | Cullin | Aug. 30, 1938 |
| 2,147,113 | Smulski | Feb. 14, 1939 |
| 2,160,736 | Horton | May 30, 1939 |
| 2,234,791 | Zaiger | Mar. 11, 1941 |
| 2,266,385 | Scinta | Dec. 16, 1941 |
| 2,274,277 | Rousseau | Feb. 24, 1942 |
| 2,284,823 | Horton | June 2, 1942 |
| 2,432,689 | Smulski | Dec. 16, 1947 |
| 2,432,693 | Anderson | Dec. 16, 1947 |

FOREIGN PATENTS

| Number | Country | Date |
| --- | --- | --- |
| 613,313 | Great Britain | Nov. 25, 1948 |